(12) United States Patent
Yohanan et al.

(10) Patent No.: US 8,314,583 B2
(45) Date of Patent: Nov. 20, 2012

(54) SYSTEM, METHOD AND PROGRAM PRODUCT FOR CABLE LOSS COMPENSATION IN AN ELECTRICAL SUBMERSIBLE PUMP SYSTEM

(75) Inventors: Tom G. Yohanan, Broken Arrow, OK (US); Dick L. Knox, Claremore, OK (US); John M. Leuthen, Claremore, OK (US); Jim E. Layton, Chelsea, OK (US); Howard G. Thompson, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 926 days.

(21) Appl. No.: 12/400,405

(22) Filed: Mar. 9, 2009

(65) Prior Publication Data

US 2009/0256519 A1    Oct. 15, 2009

Related U.S. Application Data

(60) Provisional application No. 61/035,764, filed on Mar. 12, 2008.

(51) Int. Cl.
  *H02P 7/00* (2006.01)
(52) U.S. Cl. ......... 318/479; 318/650; 318/812; 318/813
(58) Field of Classification Search .................. 318/479, 318/615, 616, 617, 632, 644, 650, 671, 717, 318/719, 812, 813, 814; 323/247, 276, 277, 323/279, 293; 417/42, 44.1, 45, 212, 237
See application file for complete search history.

(56) References Cited

U.S. PATENT DOCUMENTS

| | | | | |
|---|---|---|---|---|
| 4,352,394 A | * | 10/1982 | Zehren | ........................... 166/106 |
| 4,950,916 A | | 8/1990 | Moran | |
| 5,483,232 A | | 1/1996 | Clark et al. | |
| 5,736,936 A | | 4/1998 | Bombay et al. | |
| 5,744,877 A | | 4/1998 | Owens | |
| 5,796,184 A | * | 8/1998 | Kuhnl et al. | ................... 307/118 |
| 6,045,333 A | * | 4/2000 | Breit | ............................ 417/44.1 |
| 6,264,431 B1 | * | 7/2001 | Triezenberg | ..................... 417/36 |
| 6,522,119 B1 | * | 2/2003 | Hernandez | ..................... 323/324 |
| 6,628,014 B2 | | 9/2003 | Borup | |
| 6,801,031 B1 | * | 10/2004 | Stephan | ........................ 324/126 |

(Continued)

OTHER PUBLICATIONS

Internatioinal Search Report and Written Opinion for PCT/US2009/036873 dated Jan. 12, 2010, 6 pages.

*Primary Examiner* — Walter Benson
*Assistant Examiner* — Thai Dinh
(74) *Attorney, Agent, or Firm* — Bracewell & Giuliani LLP (57) ABSTRACT

An electrical submersible pumping (ESP) system can include a pump located in a wellbore, a motor attached to the pump, a power source located at the surface, a cable electrically coupling the power source and the motor, and a current sensor. The ESP system can also include a controller communicating with the current sensor to calculate a voltage drop associated with the cable responsive to an impedance of the cable. The controller can also control a power source output voltage responsive to the calculated voltage drop. For example, the controller can adjust the power source output voltage to minimize a cable current while maintaining a minimum motor voltage. The controller can also control a motor shaft speed by changing a power source output voltage frequency to compensate for changing slip and adjust the power source output voltage to minimize the cable current while maintaining a minimum motor voltage.

14 Claims, 8 Drawing Sheets

U.S. PATENT DOCUMENTS

| | | |
|---|---|---|
| 6,914,538 B2 | 7/2005 | Baird et al. |
| 7,012,394 B2 * | 3/2006 | Moore et al. .................. 318/481 |
| 7,170,262 B2 | 1/2007 | Pettigrew |
| 7,429,842 B2 * | 9/2008 | Schulman et al. ............ 318/482 |
| 7,869,978 B2 * | 1/2011 | Anderson et al. ............. 702/182 |
| 2005/0281680 A1 | 12/2005 | Schulz |
| 2006/0257266 A1 | 11/2006 | LeDoux et al. |

\* cited by examiner

Fig. 8

SYSTEM, METHOD AND PROGRAM PRODUCT FOR CABLE LOSS COMPENSATION IN AN ELECTRICAL SUBMERSIBLE PUMP SYSTEM

RELATED APPLICATIONS

This application claims priority to and the benefit of U.S. Provisional Patent Application Ser. No. 61/035,764, by Yohanan et al., titled "System, Method and Program Product for Cable Loss Compensation in an Electrical Submersible Pump System", filed Mar. 12, 2008, incorporated herein by reference in its entirety.

BACKGROUND

1. Field of Invention

The present invention relates in general to electrical submersible pump (ESP) systems and, in particular, to an improved system, method, and program product for controlling motor terminal voltage under varying load conditions by compensating for cable loss.

2. Background

Electrical submersible pumping (ESP) systems are often used in hydrocarbon producing wells for pumping fluids from within the wellbore to the surface. Within this specification, the term wellbore includes oil wells, gas wells, geothermal wells, carbon sequestration wells, and others as understood by those skilled in the art. A typical ESP system includes a centrifugal pump which is driven by a three-phase AC motor, both located in the wellbore, and a variable speed drive which delivers three-phase power to the motor, located at the surface. Connecting the motor to the variable speed drive is a cable Because the motor can be a very long distance from the variable speed drive, the voltage drop in the cable is very significant.

Wellbore characteristics and production goals determine the design of the ESP system, including the choice of motor and target operating speed, often described in terms of revolutions per minute (RPM). Because of different viscosities, densities, well flowing characteristics, and the like, it is desirable to vary to the speed of the motor. Typically, the output voltage of the variable speed drive is set to produce rated voltage at the motor terminals when the motor is operating at or near ratings. The output voltage of the variable speed drive is then varied linearly with the operating frequency to maintain a constant V/Hz ratio at the terminals of the variable speed drive.

Varying the output voltage of the variable speed drive linearly with operating frequency has a known problem. For example, if the operating speed of the motor is decreased for any reason, the load on the motor decreases because the pump load is a function of the revolutions per minute. A decreased load on the motor results in a lower motor current, which in turn decreases the voltage drop in the cable. Because the motor can be a very long distance from the variable speed drive, a decreased voltage drop in the cable is very significant. The end result is that the motor terminal voltage is too high, which can cause extra heating of the motor, decreased efficiency, and saturation of the core leading to other problems, as understood by those skilled in the art.

Whereas varying the output voltage of the variable speed drive with the operating frequency to maintain a constant V/Hz ratio at the terminals of the variable speed drive produces a linear V/HZ curve, one alternative approach known in the industry to mitigate this problem is to employ a "shaped" V/Hz curve. Rather than linear curve, the "shaped" V/Hz curve may be a piecewise continuous curve, or similar curve as understood by those skilled in the art, based on the expected motor load for a centrifugal pump.

SUMMARY OF INVENTION

Applicants recognize deficiencies in the prior art approaches of varying the output voltage of the variable speed drive with the operating frequency to fit a linear or "shaped" V/Hz curve. The approaches of the prior art are not responsive to all changes in well conditions. For example, the motor load can change even at a constant RPM due to well conditions. In that case, varying the output voltage of the variable speed drive with the operating frequency according to either a linear or "shaped" V/Hz curve fails to provide the proper rated motor voltage because the frequency, that is, the RPM, is constant and under the prior art the voltage from the variable speed drive is maintained, despite the motor load changing. The proper rated motor voltage is only "proper" at rated load. However, the change in the motor load results in a change in the motor current, which in turn results in a change in the voltage drop in the cable. Because the motor can be a very long distance from the variable speed drive, a change in the voltage drop in the cable can be very significant. The end result is a change in the motor terminal voltage, which can cause various problems as understood by those skilled in the art. Applicants recognize the prior art approach as a source of the problem. Applicants further recognize the need to actively modify an output voltage of the variable speed drive of an ESP system in order to control a voltage at the motor terminals under varying conditions.

Accordingly, embodiments of the present invention provide a method, system, and program product to control voltage at the motor terminals under varying conditions by actively modifying the output voltage of the variable speed drive to compensate for cable loss in the ESP system. Embodiments of the present invention advantageously utilize algorithms to optimize output voltage of the variable speed drive in an ESP system, which include compensating for cable loss using the motor current and the complex impedance of the cable.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Applicants recognize deficiencies in the prior art approaches of varying the output voltage of the variable speed drive with the operating frequency to fit a linear or "shaped" V/Hz curve. The approaches of the prior art are not responsive to all changes in well conditions, and Applicants recognize the prior art approach as a source of the problem. Applicants further recognize the need to actively modify an output voltage of the variable speed drive of an ESP system in order to control a voltage at the motor terminals under varying conditions. Accordingly, described herein are embodiments of a method, system, and program product to control and optimize voltage at the motor terminals under varying conditions by actively modifying the output voltage of the variable speed drive to compensate for cable loss in the ESP system.

Embodiments of the present invention provide a more accurate approach for controlling a motor terminal voltage in an ESP system and actively modifying the output voltage of the surface variable speed drive. Under existing approaches, voltage drop in the cable is not compensated for accurately. Under embodiments of the present invention, the voltage drop in the cable is calculated and directly compensated for as part of actively modifying the output voltage of the surface variable speed drive. Benefits of the embodiments of the present invention include improve efficiency and improved system performance.

Figure 1:
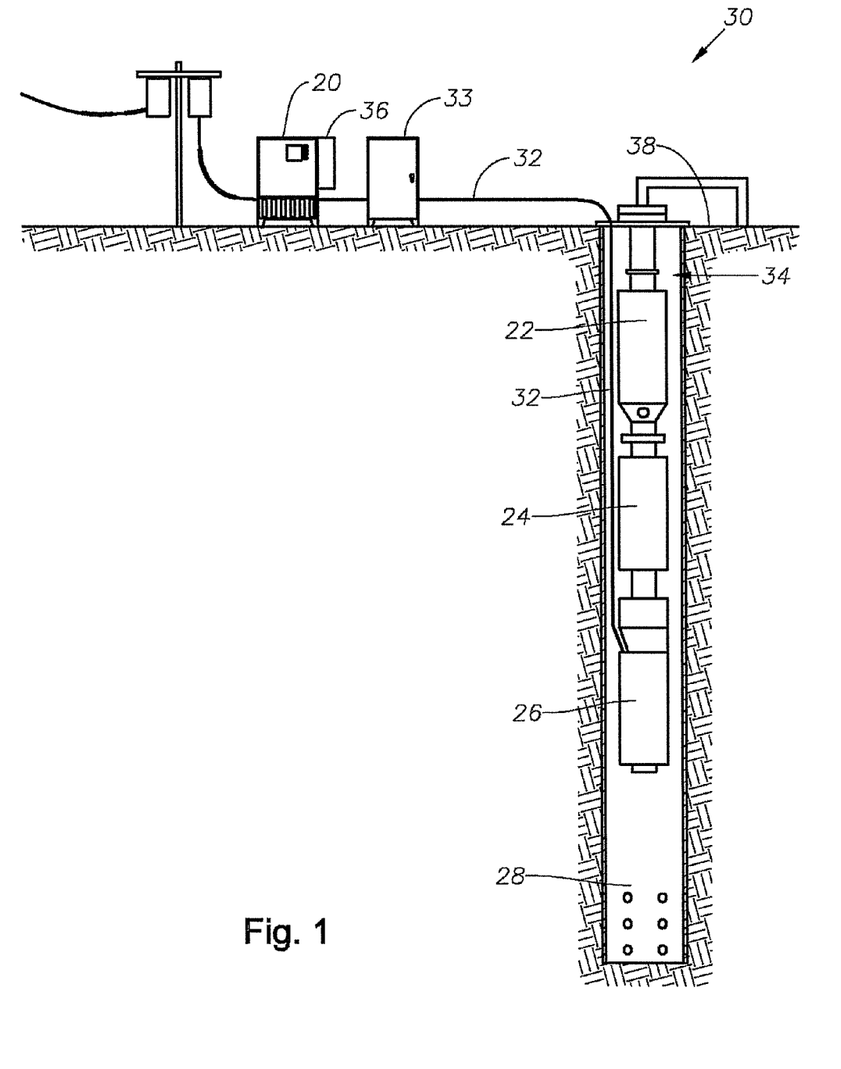
FIG. 1 is a schematic side view of an embodiment of an electrical submersible pump system in accordance with the present invention.

With reference now to FIG. 1, one type of electrical submersible pump (ESP) system 30 includes a centrifugal pump 22, a motor 26, and a seal assembly 24 located between the pump 22 and motor 26. The ESP system 30 is located with a wellbore 28. The ESP system 30 further includes a variable speed drive 20 and controller 36 located on the surface 38 and associated with the variable speed drive 20. An ESP system often includes a step-up transformer 33, located between the variable speed drive 20 and a cable 32. The cable 32 provides power, e.g., three-phase power, and communications between the variable speed drive 20 and the motor 26. The variable speed drive 20 may operate as a power source for providing electrical power for driving the motor 26. The cable 32 typically extends thousands of feet and thereby introduces significant electrical impedance between the variable speed drive 20 (or step-up transformer 33) and the motor 26. By altering the output voltage and frequency of the variable speed drive 20, the controller 36 associated with the variable speed drive 20 controls the voltage at motor 26 terminals. Typically, the cable 32 connects to a motor lead extension (not shown) proximate to the pumping system. The motor lead extension continues in the wellbore 28 adjacent the system 34 and terminates in what is commonly referred to as a "pothead connection" at the motor 26. In one embodiment, the motor terminal comprises the pothead connection.

Figure 2:
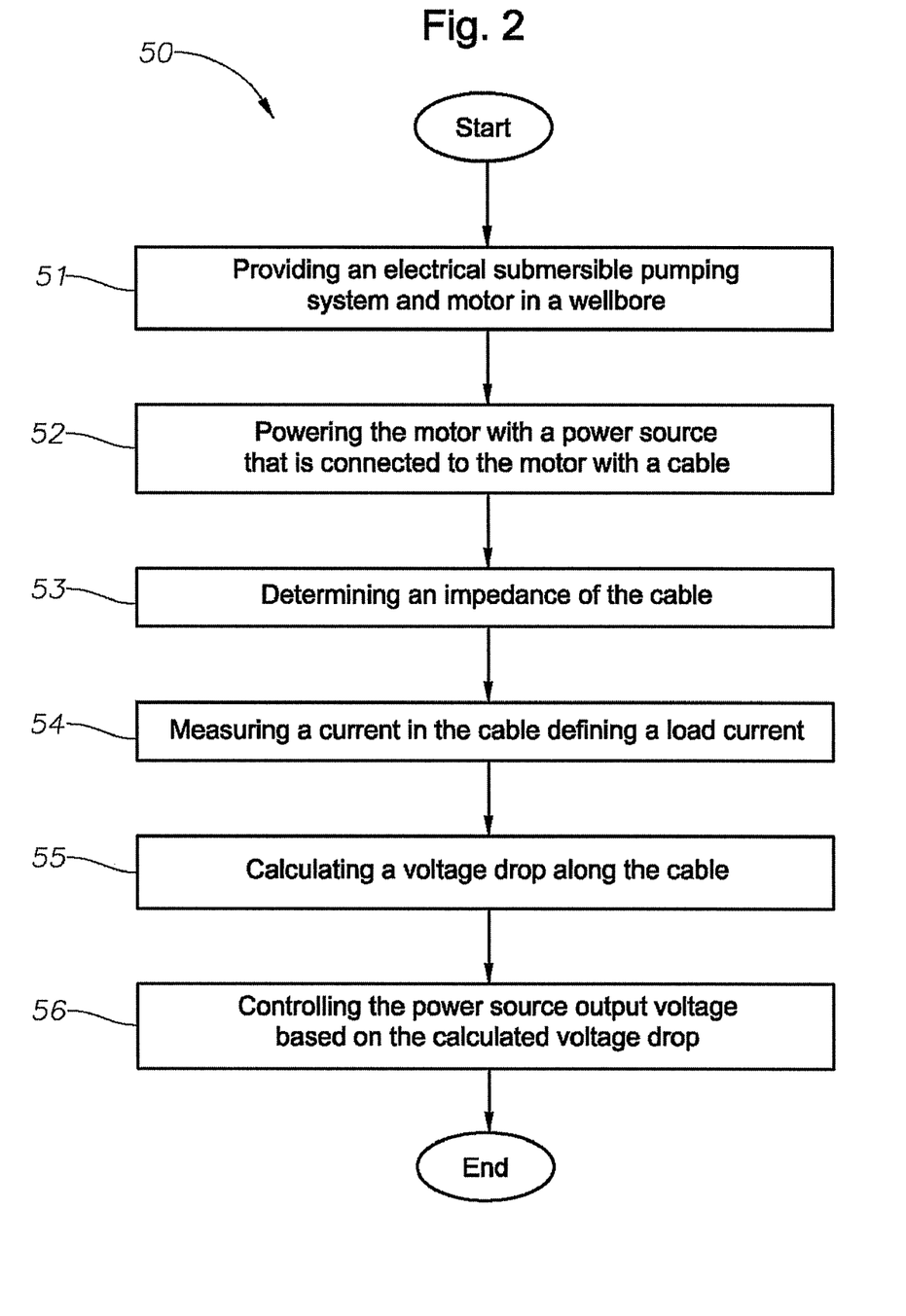
FIG. 2 is a method of operating an electrical submersible pumping system according to an embodiment of the present invention.

With reference now to FIG. 2, an embodiment of the present invention includes a method 50 of controlling voltage supplied to an electrical submersible pumping system. The method includes providing an electrical submersible pumping system pump and motor in a wellbore (step 51) and powering the motor with a power source that is connected to the motor with a cable (step 52). The method also includes determining an impedance of a cable in an electrical submersible pumping system (step 53). The impedance of the cable can be determined through a measurement as understood by those skilled in the art. Alternately, the impedance of the cable can be calculated from the length of the cable. The cable is connected between a downhole motor and a surface variable speed drive and delivers power, e.g., three-phase power, from the surface to the downhole motor. The method also includes determining a current in the cable (step 54), including a three-phase current. In an embodiment of an ESP system without a step up transformer, a direct measurement of the current in the cable can occur at the output of the drive, or elsewhere with access to the cable as understood by those skilled in the art. In an alternate embodiment of an ESP system with a step up transformer, the current is the cable can be determined from measurements of the current at the output of the drive and a calculation that takes into account the transformer. Assuming ideal transformer efficiency, the primary side current times the number of turns on the primary side coil equals the secondary side current times the number of turns on the secondary side coil, as understood by those skilled in the art. The method further includes calculating a voltage drop associated with the cable (step 55). Motor operation may fluctuate due to variations in fluid properties and conditions, such as, density, viscosity, fluid phase, temperature, and pressure, to name but a few. This fluctuation may affect the motor current consumption, which in turn causes a corresponding change in the cable voltage drop. The voltage drop associated with the cable is the product of the cable impedance and current in the cable. One embodiment of the present method further includes continued or periodic monitoring of the current in the cable. Also included is continued or periodic cable voltage drop evaluation. The method also includes controlling the output of a power source, such as a surface variable speed drive, in response to the aforementioned fluctuations in cable current, cable voltage drop, or combinations thereof. Controlling the power source output involves regulating or adjusting the voltage output. In one embodiment, the power supply output is modified to control a motor terminal voltage by compensating for the voltage drop associated with the cable (step 56). That is, the method directly compensates for the voltage drop associated with the cable to control the output of the variable speed drive. The control method employed may comprise simple feedback, linear, proportional, or any other control scheme.

In another embodiment of the present invention, the method can include controlling the power source output voltage based on the calculated voltage drop to optimize a voltage to the motor. One simple optimization approach can include adjusting the power source output voltage for minimum current to maintain the proper voltage to the motor according to an embodiment of the present invention. While an improvement over the prior art, this approach may not yield the best efficiency. In a second optimization embodiment, shaft speed is controlled by compensating for changing slip with changing frequency, while adjusting the output voltage to obtain minimum current according to an embodiment of the present invention. This second approach may require more processing power, but may better optimize system efficiency.

Features of the embodiments of the present invention provide benefits and advantages. Features of the embodiments of the present invention include an improved responsiveness to varying motor load conditions and the ability to control voltage at the motor terminals by directly compensating for voltage loss in the cable. The benefits of the embodiments of the present invention include preventing extra heating of the motor, decreased efficiency, and saturation of the core leading to other problems as understood by those skilled in the art. Still other advantages include reduction in overall product lifecycle cost and improved efficiency.

Figure 3:
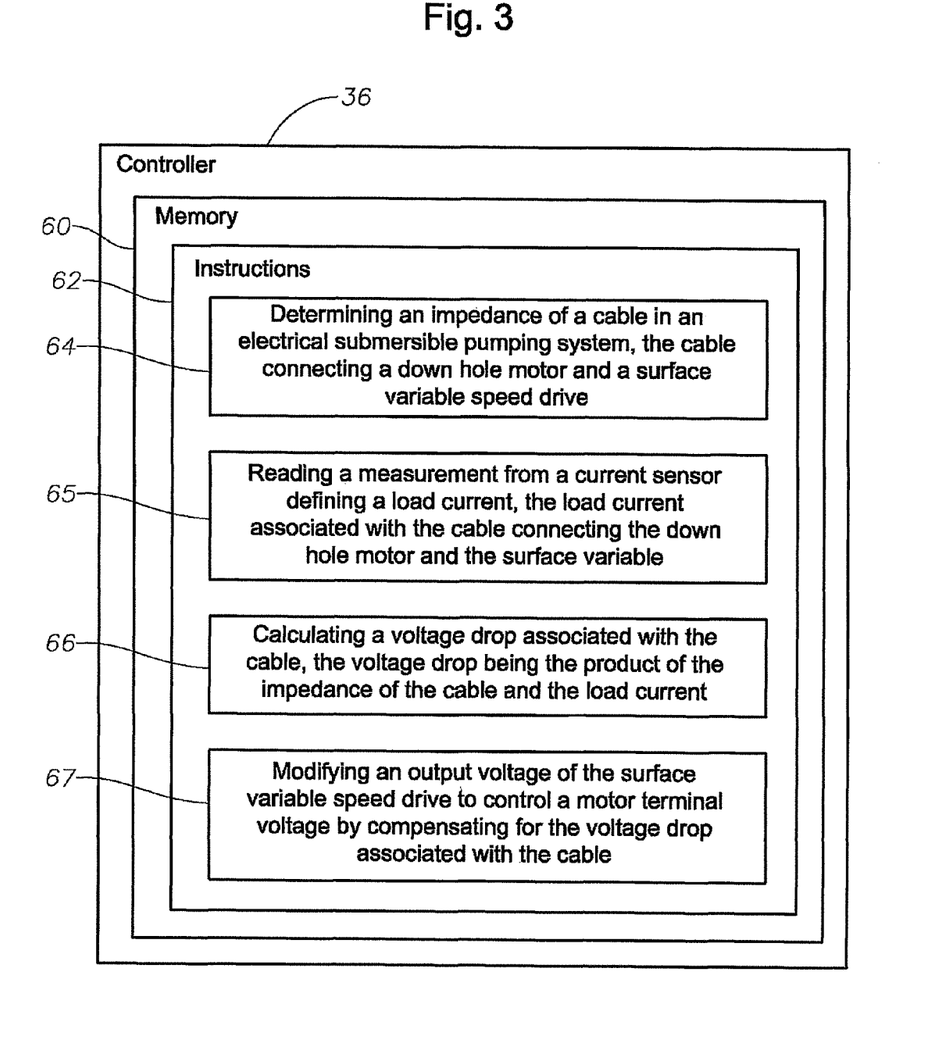
FIG. 3 is a schematic diagram of a program product associated with an electrical submersible pumping system according to an embodiment of the present invention.

With reference now to FIG. 3, an embodiment of the present invention includes a program product stored in a tangible computer medium that when executed by a computer performs various operations. The operations include determining an impedance of a cable in an electrical submersible pumping system (block 64) and determining a current in the cable (block 65). The current in the cable can be determined directly by measurements from a current sensor at the variable speed drive in an embodiment of an ESP system without a step-up transformer. Alternately, the current in the cable can be determined from measurements from a current sensor at the variable speed drive and a calculation that takes into account the transformer in an embodiment of an ESP system with a step-up transformer. The operations also include calculating a voltage drop associated with the cable (block 66). As noted above, the voltage drop associated with the cable is the product of the impedance of the cable and the current in the cable. The operations further include modifying an output voltage of the surface variable speed drive to control a motor terminal voltage by compensating for the voltage drop associated with the cable (block 67). That is, the controller can calculate the voltage drop associated with the cable and directly compensate for this voltage drop, to control the output of the variable speed drive.

In addition, another program product embodiment of the present invention includes modifying an output voltage and frequency of the surface variable speed drive to optimize the voltage to the downhole motor. One optimization includes adjusting the power source output voltage to provide a minimum current in the cable that maintains a proper motor voltage, that is, the manufacturer's rated voltage for the motor load, according to an embodiment of the present invention. Another optimization approach includes controlling the shaft speed by compensating for changing slip, or other varying wellbore conditions, with changing frequency, while adjusting the output voltage to provide a minimum current that maintains a proper motor voltage according to an embodiment of the present invention. That is, the motor shaft speed is controlled by changing a power source output voltage frequency to thereby compensate for changing slip and the power source output voltage is adjusted to minimize the load current, while maintaining a minimum motor voltage so that the motor operates within the manufacturer's specifications.

Figure 4:
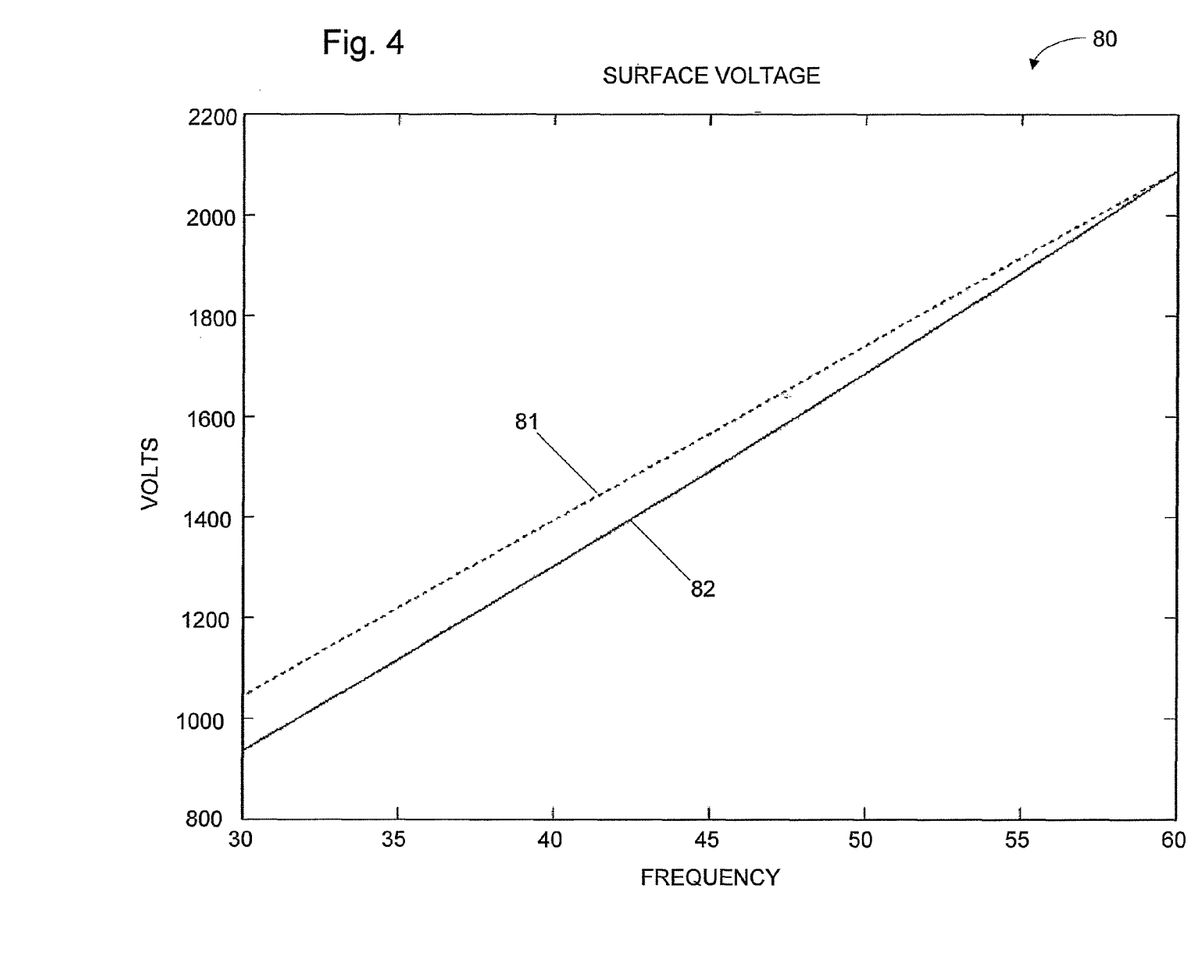
FIG. 4 is an exemplary graph of surface voltage versus motor frequency for an example according to the prior art and an example according to an embodiment of the present invention.
Figure 5:
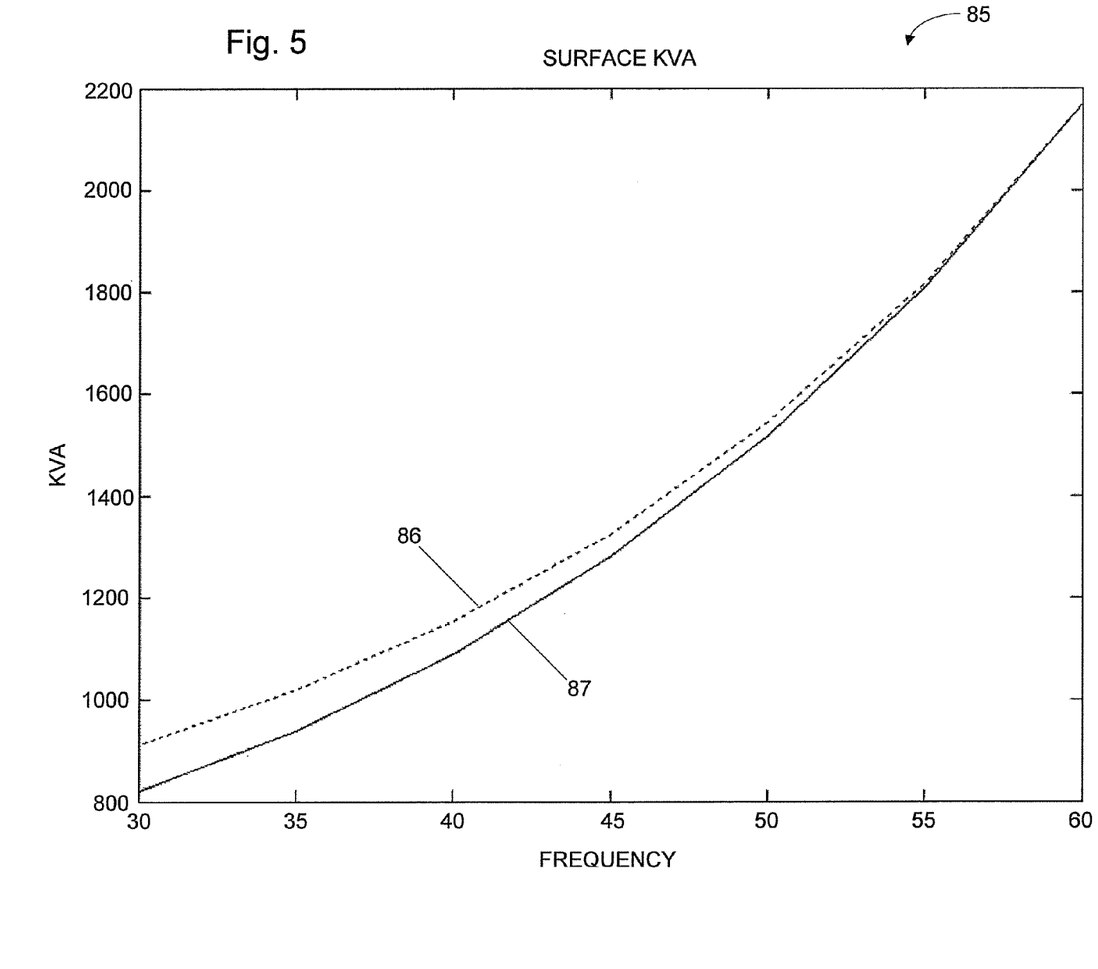
FIG. 5 is an exemplary graph of surface power versus motor frequency for an example according to the prior art and an example according to an embodiment of the present invention.
Figure 6:
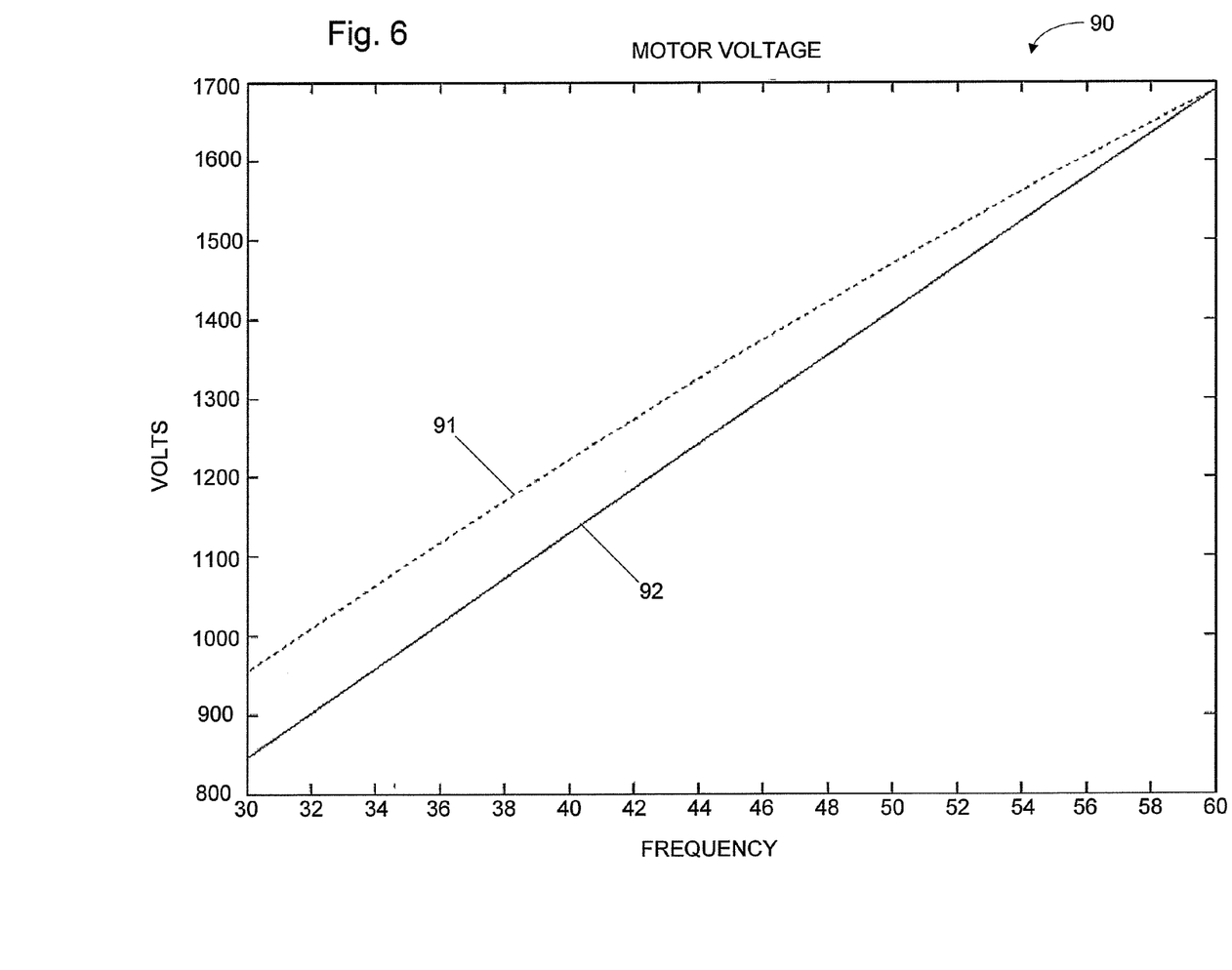
FIG. 6 is an exemplary graph of motor voltage versus motor frequency for an example according to the prior art and an example according to an embodiment of the present invention.
Figure 7:
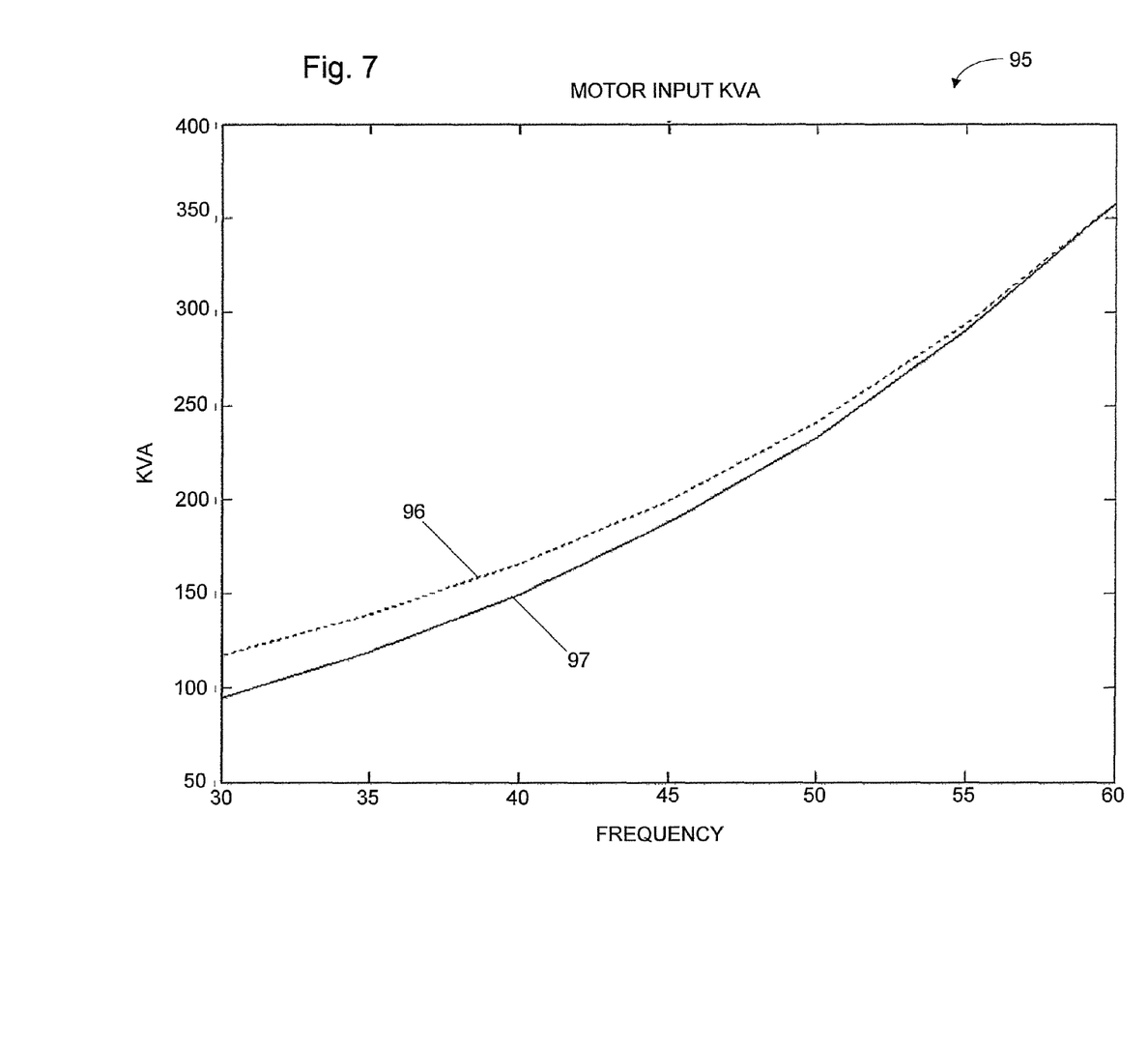
FIG. 7 is an exemplary graph of motor input power versus motor frequency for an example according to the prior art and an example according to an embodiment of the present invention.
Figure 8:
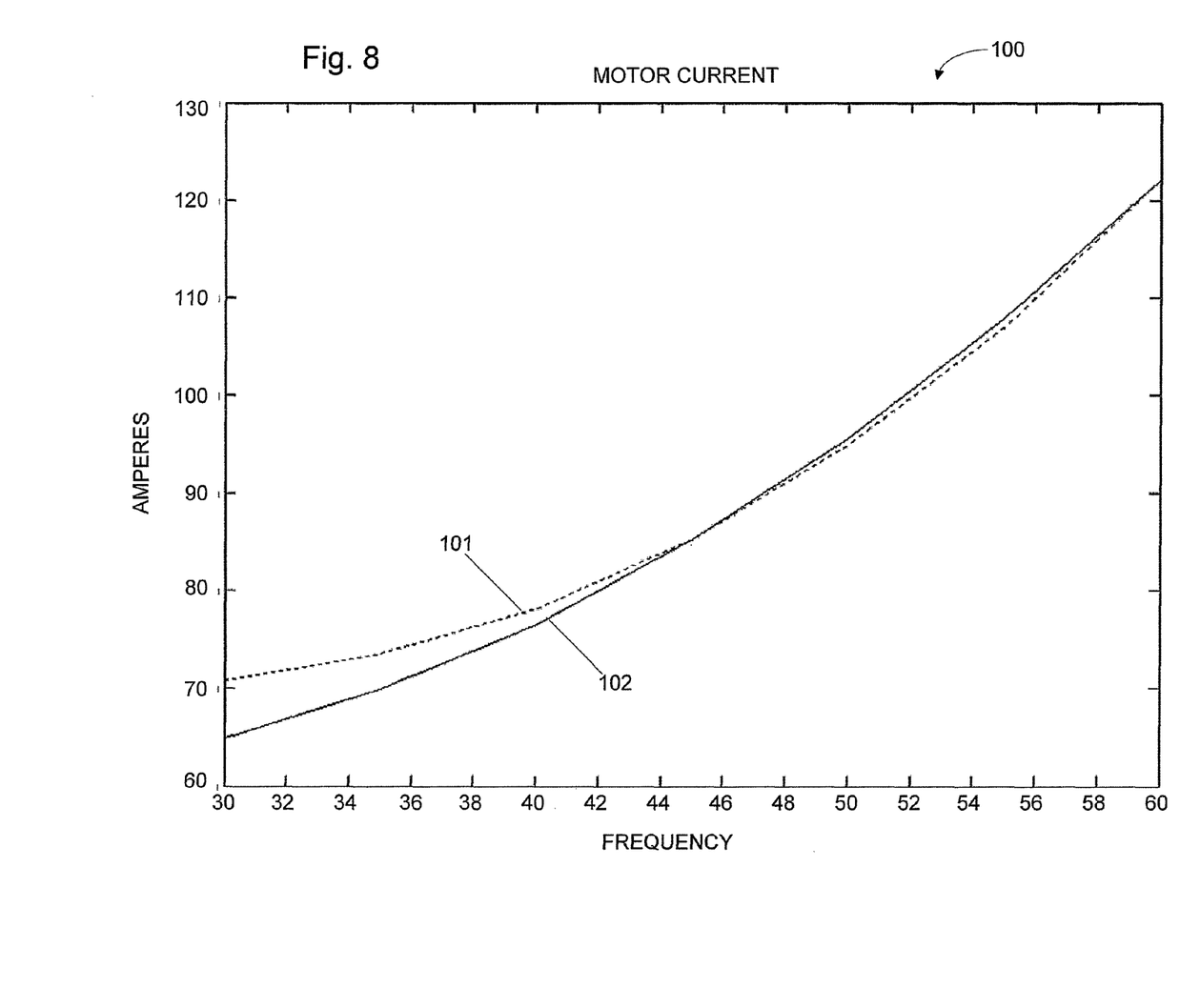
FIG. 8 is an exemplary graph of motor current versus motor frequency for an example according to the prior art and an example according to an embodiment of the present invention.

FIGS. 4-8 provide resulting data for an example according to an embodiment of the present invention contrasted with an example according to the prior art. These examples of an ESP system include a 342-horsepower 1695-volt motor, a 342 horsepower pump load at 60 Hz, and 10,000 feet of cable. As the operating speed of the motor, or frequency, is decreased (due to, for example, a change in the downhole conditions), the load on the motor decreases because the pump load is a function of the revolutions per minute. A decreased load on the motor results in a lower motor current, which in turn decreases the voltage drop in the cable. According to the prior art, the output voltage of the variable speed drive, or the surface voltage, is varied linearly with operating frequency of the motor. The data corresponding to the example according to the prior art is shown by a dotted line 81, 86, 91, 96, 101 in the various graphs. According to the embodiments of the present invention, the voltage drop associated with the cable is calculated so that the output voltage of the variable speed drive, or the surface voltage, is controlled responsive to the voltage drop associated with the cable. The data corresponding to the example according to the embodiment of the present solution is shown by a solid line 82, 87, 92, 97, 102 in the various graphs. FIG. 4 is an exemplary graph of surface voltage versus motor frequency 80, illustrating data for the example according to an embodiment of the present invention in the solid line 82 contrasted with data for the example according to the prior art in the dotted line 81. FIG. 5 is an exemplary graph of surface power (KVA) versus motor frequency 85, illustrating data for the example according to an embodiment of the present invention in the solid line 87 contrasted with data for the example according to the prior art in the dotted line 86. FIG. 6 is an exemplary graph of motor voltage versus motor frequency 90, illustrating data for the example according to an embodiment of the present invention in the solid line 92 contrasted with data for the example according to the prior art in the dotted line 91. FIG. 7 is an exemplary graph of motor input power (KVA) versus motor frequency 95, illustrating data for the example according to an embodiment of the present invention in the solid line 97 contrasted with data for the example according to the prior art in the dotted line 96. FIG. 8 is an exemplary graph of motor current versus motor frequency 100, illustrating data for the example according to an embodiment of the present invention in the solid line 102 contrasted with data for the example according to the prior art in the dotted line 101. As can be shown in this example, the benefits of the embodiments of the present invention include increased efficiency through a reduction in surface voltage over a range of frequencies (see especially FIG. 4), the preventing extra heating of the motor through a reduction in motor voltage (see especially FIG. 6), and the decrease in power loss in the cable through a reduction in motor current (see especially FIG. 8).

A person having ordinary skill in the art will recognize that various types of memory are readable by a computer. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and/or instructions related to the system and the method steps described above.

This application claims priority to and the benefit of U.S. Provisional Patent Application Ser. No. 61/035,764, by Yohanan et al., titled "System, Method and Program Product for Cable Loss Compensation in an Electrical Submersible Pump System", filed Mar. 12, 2008, incorporated herein by reference in its entirety.

While the invention has been shown or described in only some of its forms, it should be apparent to those skilled in the art that it is not so limited, but is susceptible to various changes without departing from the scope of the invention. For example, various components and/or designs can be utilized to implement the algorithms described herein or a varia- That claimed is:

1. An electrical submersible pumping system disposed in a wellbore, the system comprising:
   a pump located in the well bore;
   a motor attached to the pump;
   a power source located at the surface;
   a cable electrically coupling the power source and the motor;
   a current sensor; and
   a controller in communication with the current sensor and configured to calculate the voltage drop associated with the cable responsive to an impedance of the cable and to control an output voltage of the power source responsive to the calculated voltage drop;
   wherein the power source includes a variable speed drive and a transformer having a primary side connected with the variable speed drive and a secondary side connected to the cable, and wherein the current sensor is positioned to measure the current at an output of the variable speed drive, and wherein the controller is further configured to calculate a current on the secondary side of the transformer responsive to a measurement of a current on a primary side of the transformer.

2. An electrical submersible pumping system of claim 1, further comprising a program product associated with a controller, stored in a tangible computer medium and operable on a controller, the program product comprising a set of instructions that, when executed by the controller, cause the controller to perform the operations of:
   adjusting the power source output voltage to minimize a current associated with the cable while maintaining a minimum motor voltage.

3. An electrical submersible pumping system of claim 1, further comprising a program product associated with a controller, stored in a tangible computer medium and operable on a controller, the program product comprising a set of instructions that, when executed by the controller, cause the controller to perform the operations of:
   controlling a motor shaft speed by changing a power source output voltage frequency to thereby compensate for changing slip, and
   adjusting the power source output voltage to minimize the load current while maintaining a minimum motor voltage.

4. An electrical submersible pumping system of claim 1, further including a display located at the surface positioned to provide a visual depiction of a calculated motor voltage responsive to the calculated voltage drop associated with the cable.

5. A program product associated with a controller, stored in a tangible computer medium and operable on a controller, the program product comprising a set of instructions that, when executed by the controller, cause the controller to perform the operations of:
   determining an impedance of a cable in an electrical submersible pumping system, the cable connecting a downhole motor and a surface power source;
   receiving a current measurement from a current sensor;
   calculating a voltage drop associated with the cable, responsive to the determined impedance of the cable and the current measurement; and
   modifying an output voltage of the surface variable speed drive to control a motor terminal voltage by compensating for the voltage drop associated with the cable,
   wherein the power source includes a variable speed drive and a transformer, and
   wherein the operation of calculating a voltage drop associated with the cable, responsive to the determined impedance of the cable and the current measurement, includes calculating a current on a secondary side of the transformer responsive to a measurement of a current on a primary side of the transformer.

6. A program product of claim 5, wherein the operation of modifying an output voltage of the surface variable speed drive to control a motor terminal voltage by compensating for the voltage drop associated with the cable further includes:
   adjusting the power source output voltage to minimize the load current while maintaining a minimum motor voltage.

7. A program product of claim 5, wherein the operation of modifying an output voltage of the surface variable speed drive to control a motor terminal voltage by compensating for the voltage drop associated with the cable further includes:
   controlling a motor shaft speed by changing a power source output voltage frequency to thereby compensate for changing slip, and
   adjusting the power source output voltage to minimize the load current while maintaining a minimum motor voltage.

8. A program product of claim 5, wherein the operation of determining an impedance of a cable in an electrical submersible pumping system, the cable connecting a downhole motor and a surface power source, further includes:
   measuring the impedance of the cable.

9. A program product of claim 5, wherein the operation of determining an impedance of a cable in an electrical submersible pumping system, the cable connecting a downhole motor and a surface power source, further includes:
   calculating the impedance of the cable responsive to a length of the cable.

10. A method of operating an electrical submersible pumping system comprising:
    providing an electrical submersible pump and motor in a wellbore;
    powering the motor from a surface power source that is connected to the motor through a cable;
    determining an impedance of the cable;
    determining a current in the cable defining a load current;
    calculating a voltage drop along the cable responsive to the determined impedance of the cable and the load current; and
    controlling the power source output voltage based on the calculated voltage drop associated with the cable:
    wherein the power source includes a variable speed drive and a transformer, and
    wherein the step of determining a current in the cable includes calculating a current on a secondary side of the transformer responsive to a measurement of a current on a primary side of the transformer.

11. A method of claim 10, wherein the step of controlling the power source output voltage based on the calculated voltage drop further includes:
    adjusting the power source output voltage to minimize the load current while maintaining a minimum motor voltage.

12. A method of claim 10, wherein the step of controlling the power source output voltage based on the calculated voltage drop further includes:
 controlling a motor shaft speed by changing a power source output voltage frequency to thereby compensate for changing slip, and
 adjusting the power source output voltage to minimize the load current while maintaining a minimum motor voltage.

13. A method of claim 10, wherein the step of determining the impedance of the cable involves measuring the impedance of the cable.

14. A method of claim 10, wherein step of determining the impedance of the cable involves calculating the impedance of the cable responsive to a length of the cable.

* * * * *

UNITED STATES PATENT AND TRADEMARK OFFICE
CERTIFICATE OF CORRECTION

| | |
|---|---|
| PATENT NO. | : 8,314,583 B2 |
| APPLICATION NO. | : 12/400405 |
| DATED | : November 20, 2012 |
| INVENTOR(S) | : Tom G. Yohanan et al. |

Page 1 of 1

It is certified that error appears in the above-identified patent and that said Letters Patent is hereby corrected as shown below:

Column 10, claim 14, line 1, after "wherein" insert --the--

Signed and Sealed this
Nineteenth Day of February, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,314,583 B2  
APPLICATION NO. : 12/400405  
DATED : November 20, 2012  
INVENTOR(S) : Tom G. Yohanan et al.

Page 1 of 1

It is certified that error appears in the above-identified patent and that said Letters Patent is hereby corrected as shown below:

Column 10, line 4 (claim 14, line 1) after "wherein" insert --the--

This certificate supersedes the Certificate of Correction issued February 19, 2013.

Signed and Sealed this  
Nineteenth Day of March, 2013

Teresa Stanek Rea  
*Acting Director of the United States Patent and Trademark Office*